(12) United States Patent
Aso et al.

(10) Patent No.: US 10,395,553 B2
(45) Date of Patent: Aug. 27, 2019

(54) METHOD, RECORDING MEDIUM, AND APPARATUS FOR CONTROLLING IMAGE DISPLAYED ON DISPLAY

(71) Applicant: Panasonic Intellectual Property Corporation of America, Torrance, CA (US)

(72) Inventors: Mitsuhiro Aso, Osaka (JP); Masao Nonaka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 496 days.

(21) Appl. No.: 15/059,550

(22) Filed: Mar. 3, 2016

(65) Prior Publication Data

US 2016/0284230 A1    Sep. 29, 2016

(30) Foreign Application Priority Data

Mar. 27, 2015 (JP) ................. 2015-067172
Dec. 25, 2015 (JP) ................. 2015-254167

(51) Int. Cl.
G09B 19/00 (2006.01)
G09B 5/02 (2006.01)
G06T 11/60 (2006.01)

(52) U.S. Cl.
CPC .............. G09B 19/00 (2013.01); G06T 11/60 (2013.01); G09B 5/02 (2013.01); G09B 19/0092 (2013.01)

(58) Field of Classification Search
CPC ...... G09B 19/0092; G09B 5/02; G09B 19/00; G09B 5/065; G06F 19/3475; G06T 2207/30128; A23V 2002/00; F25D 2400/361; A23L 35/00; A23L 5/10; A61B 5/7475; A61B 5/742; G06Q 30/0643
USPC ........................................................ 434/127
See application file for complete search history.

(56) References Cited

U.S. PATENT DOCUMENTS

| | | | | |
|---|---|---|---|---|
| 8,342,847 | B2* | 1/2013 | Do | G09B 21/00 219/385 |
| 8,419,433 | B2* | 4/2013 | Do | G06F 17/30867 219/385 |
| 8,992,225 | B2* | 3/2015 | Do | G09B 21/00 219/385 |
| 2009/0258331 | A1* | 10/2009 | Do | G09B 21/003 434/127 |
| 2009/0258332 | A1* | 10/2009 | Do | G09B 21/003 434/127 |
| 2014/0272817 | A1* | 9/2014 | Park | G09B 5/02 434/127 |
| 2015/0120705 | A1* | 4/2015 | Osaki | G06F 16/951 707/722 |

FOREIGN PATENT DOCUMENTS

JP    2002-215886    8/2002
JP    2013-213663    10/2013

* cited by examiner

Primary Examiner — Jerry-Daryl Fletcher
(74) Attorney, Agent, or Firm — Greenblum & Bernstein, P.L.C.

(57) ABSTRACT

A method includes: causing a processor to determine a first step from among a plurality of steps that should be executed in order in cooking; and causing the processor to display, on a display, a guide image including a first indicative contents of the determined first step and a second indicative contents of a second step that is a step that should be executed next to the first step.

14 Claims, 9 Drawing Sheets

| NUMBER | TEXT | IMAGE |
|---|---|---|
| Step 1 | CUT TOMATO INTO DICE SIZE (ABOUT 1 cm SQUARES). | |
| Step 2 | CUT MACKEREL INTO FILLETS AND SEASON THEM WITH SALT AND PEPPER. | |
| Step 3 | COAT SEASONED MACKEREL FILLETS WITH FLOUR. | |
| Step 4 | PUT BUTTER IN FRYING PAN AND HEAT IT OVER LOW HEAT. | LOW HEAT |
| Step 5 | WHEN BUTTER STARTS TO MELT, PUT MACKEREL FILLETS WITH THEIR SKIN FACING DOWNWARD AND COOK THEM OVER LOW HEAT FOR ABOUT 10 MINUTES. | LOW HEAT |
| Step 6 | ABOUT 10 MINUTES LATER, ONCE THEY ARE BROWNED, FLIP THEM OVER AND COOK THEM FOR 5 MINUTES OVER LOW HEAT. | LOW HEAT |
| ⋮ | ⋮ | ⋮ |

मेटHOD, RECORDING MEDIUM, AND APPARATUS FOR CONTROLLING IMAGE DISPLAYED ON DISPLAY

BACKGROUND

1. Technical Field

The present disclosure relates to a method, a recording medium, and an apparatus for controlling image displayed on display.

2. Description of the Related Art

People have referred to books and magazines describing recipes during cooking for years. Information indicating a recipe (hereinafter referred to as "recipe information") describes, in an order of steps, contents of a plurality of steps (hereinafter referred to as "step contents"), such as "cutting vegetables" and "grilling fish", that should be executed in the order during cooking.

In recent years, electronically displaying recipe information on a display of a cooking appliance such as a microwave oven or a mobile terminal such as a tablet terminal is becoming widespread.

However, the technique of displaying recipe information on a display needs further improvements.

SUMMARY

In one general aspect, the techniques disclosed here feature a method including: causing a processor to determine a first step from among a plurality of steps that should be executed in order in cooking; and causing the processor to display, on a display, a guide image including first indicative contents of the determined first step and second indicative contents of a second step that is a step that should be executed next to the first step.

According to the aspect, further improvements have been accomplished.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

A technique of electronically displaying recipe information on a display of a cooking appliance such as a microwave oven or a mobile terminal such as a tablet terminal is disclosed, for example, in Japanese Unexamined Patent Application Publication No. 2013-213663 and Japanese Unexamined Patent Application Publication No. 2002-215886.

The technique described in Japanese Unexamined Patent Application Publication No. 2013-213663 displays an image collectively presenting a series of step contents on a display in a scroll. The technique described in Japanese Unexamined Patent Application Publication No. 2002-215886 sequentially displays step contents one by one in accordance with a user's operation. The conventional techniques save user's trouble of going and reading a recipe book opened on a table each time.

In order for a user to smoothly do cooking by referring to recipe information, it is desirable that the user can instantly check, at each time in a cooking procedure, contents of a step that should be executed at the time. Furthermore, since some steps need preparation of a cooking appliance and an ingredient, it is desirable that the user can also grasp contents of a step that should be executed next.

However, according to the technique described in Japanese Unexamined Patent Application Publication No. 2013-213663, information on a large number of steps is collectively displayed. It is therefore hard to grasp where information on a step that should be currently executed is. Furthermore, according to the technique described in Japanese Unexamined Patent Application Publication No. 2002-215886, contents of a step that should be executed next are not displayed. That is, the conventional techniques have a risk of hindering smooth progress of cooking and therefore cannot be considered effective cooking support.

The following improvements have been considered to improve functions of a display apparatus.

A first aspect of a method including: causing a processor to determine a first step from among a plurality of steps that should be executed in order in cooking; and causing the processor to display, on a display, a guide image including first indicative contents of the determined first step and second indicative contents of a second step that is a step that should be executed next to the first step.

According to the first aspect, the first step is determined from among the plurality of steps executed in cooking, and the guide image including the first indicative contents of the first step and the second indicative contents of the second step that should be executed next to the first step is displayed on the display.

This makes it possible to, for example, not only present detailed contents of a step that should be currently executed to a user, but also additionally present an outline of a step that should be executed next. This allows the user to instantly check the contents of the step that should be currently executed and to do cooking while bearing preparations of a cooking instrument and an ingredient necessary for the next step in mind at each time in a cooking procedure. It is therefore possible to effectively support cooking that is done with reference to a guide image.

Furthermore, for example, simplified information of the next step is generated on the basis of detailed information of the next step included in recipe data or the like. It is therefore unnecessary to store the simplified information in a storage device such as a ROM in advance together with the recipe data, thereby making it possible to save the resource of the ROM.

In the first aspect, the method may be, for example, arranged such that the guide image does not include indicative contents of a step other than the first step and the second step. With the arrangement, since contents of a step other than the determined first step and the second step that should be executed next to the first step are not included in the displayed image, it is possible to avoid, for example, a situation where contents of a large number of steps are displayed and it is hard to refer to a desired step.

In the first aspect, the method may be, for example, arranged such that in the guide image, a display region of the second indicative contents of the second step is smaller than that of the first indicative contents of the first step. With the arrangement, since the size of the display region of the first indicative contents of the first step is different from that of the second indicative contents of the second step, it is possible to, for example, intuitively recognize which of displayed pieces of information is the first step that should be currently executed, and it is therefore possible to prevent a user from confusing the contents of the first step that should be currently executed and the contents of the second step that should be executed next.

In the first aspect, the method may be, for example, arranged such that in the guide image, a degree of detail of the second indicative contents of the second step is lower than that of the first indicative contents of the first step. With the arrangement, since the degree of detail of the first indicative contents of the first step is different from that of the second indicative contents of the second step, it is possible to, for example, intuitively recognize which of displayed pieces of information is the first step that should be currently executed, and it is therefore possible to prevent a user from confusing the contents of the first step that should be currently executed and the contents of the second step that should be executed next.

In the first aspect, the method may be, for example, arranged such that the causing the processor to determine the first step includes sequentially switching the first step among the plurality of steps; the causing the processor to display the guide image includes switching contents of the guide image are switched in accordance with the switching of the first step determined in the causing the processor to determine the first step; and in the guide image, a display region and/or a degree of detail of indicative contents of each of the plurality of steps differ between a case where the step is the first step and a case where the step is the second step. With the arrangement, since a display region and/or the degree of detail of a step changes, for example, when the step is switched from the second step to the first step, the user can instantly recognize switching to the first step.

In the first aspect, the method may be, for example, arranged such to further include: causing the processor to acquire detailed information of the first step and detailed information of the second step from recipe data including pieces of detailed information describing details of contents of the respective plurality of steps and order information indicative of the order of the plurality of steps; causing the processor to generate simplified information briefly describing the contents of the second step on basis of the acquired detailed information of the second step; and causing the processor to generate the guide image including the detailed information of the first step and the simplified information of the second step. With the arrangement, since simplified information briefly describing the contents of the second step is generated on the basis of the detailed information of the second step, the recipe data need not include both of the detailed information and the simplified information, and it is therefore possible to reduce the volume of data of the recipe data itself. Furthermore, since predetermined information is not used as the simplified information, and the simplified information is generated on the basis of the detailed information, simplified information of a proper format can be used depending on the specification of the display, user's demands, and the like.

In the first aspect, the method may be, for example, arranged such that each of the pieces of detailed information includes text information; and the causing the processor to generate the simplified information includes parsing a text indicated by the text information of the second step and generating a summary of the text as at least part of the simplified information. With the arrangement, since a summary is generated on the basis of text information included in the detailed information in the display, the detailed information need not include information indicative of the summary in addition to the text information, and it is therefore possible to reduce the volume of data.

In the first aspect, the method may be, for example, arranged such that the causing the processor to generate the simplified information includes adjusting a degree to which the text is summarized so that the summary fits into a predetermined display region. With the arrangement, since information can be displayed properly in accordance with a screen size, for example, even in a case where the method is applied to displays having different display screen sizes, it is possible to prevent a situation where information is displayed on a display having a small display screen size with the same degree of summarization as that in a display having a large display screen size and as a result the information cannot fit into the screen.

In the first aspect, the method may be, for example, arranged such that each of the pieces of detailed information includes text information and image information; and the simplified information does not include the image information. With the arrangement, since it can be determined whether displayed information indicates the first step or the second step depending on the presence or absence of image information, it is therefore possible to, for example, intuitively recognize which of displayed pieces of information is the first step that should be currently executed, and it is possible to prevent a user from confusing the contents of the first step that should be currently executed and the contents of the second step that should be executed next.

In the first aspect, the method may be, for example, arranged such that the causing the processor to determine the first step includes accepting a user's operation of selecting a single step from among the plurality of steps and sequentially determining the first step in accordance with the accepted operation. With the arrangement, since the first step can be determined on the basis of a user's selection operation, a step desired by a user can be displayed on the display.

In a second aspect, a non-transitory computer-readable recording medium having thereon a program for causing a processor to execute operations includes: determining a first step from among a plurality of steps that should be executed in order in cooking; and displaying, on a display, a guide image including a first indicative contents of the determined first step and a second indicative contents of a second step that is a step that should be executed next to the first step.

According to the second aspect, the first step is determined from among the plurality of steps executed in cooking, and the guide image including the first indicative contents of the first step and the second indicative contents of the second step that should be executed next to the first step is displayed on the display.

This makes it possible to, for example, not only present detailed contents of a step that should be currently executed to a user, but also additionally present an outline of a step that should be executed next. This allows the user to instantly check the contents of the step that should be currently executed and to do cooking while bearing preparation of a cooking instrument and an ingredient necessary for the next step in mind at each time in a cooking procedure. It is therefore possible to effectively support cooking that is done with reference to a guide image.

In a third aspect, an apparatus includes: a processor; a display; and a memory having a program stored thereon, the program causing the processor to execute operations including: determining a first step from among a plurality of steps that should be executed in order in cooking; generating a guide image including a first indicative contents of the determined first step and a second indicative contents of a second step that is a step that should be executed next to the first step; and displaying the generated guide image on a display.

According to the third aspect, the first step is determined from among the plurality of steps executed in cooking, and the guide image including the first indicative contents of the first step and the second indicative of contents of a second step that should be executed next to the first step is displayed on the display.

This makes it possible to, for example, not only present detailed contents of a step that should be currently executed to a user, but also additionally present an outline of a step that should be executed next. This allows the user to instantly check the contents of the step that should be currently executed and to do cooking while bearing preparation of a cooking instrument and an ingredient necessary for the next step in mind at each time in a cooking procedure. It is therefore possible to effectively support cooking that is done with reference to a guide image.

A purpose of the present disclosure is to provide a method, a recording medium, and an apparatus that can effectively support cooking that is done with reference to recipe information.

Embodiment

An embodiment of the present disclosure is described in detail below with reference to the drawings. The present embodiment is an example of a specific aspect of a case where the present invention is applied to a tablet terminal including a liquid crystal display with touch panel and a wireless communication circuit.

Configuration of Apparatus

Figure 1:
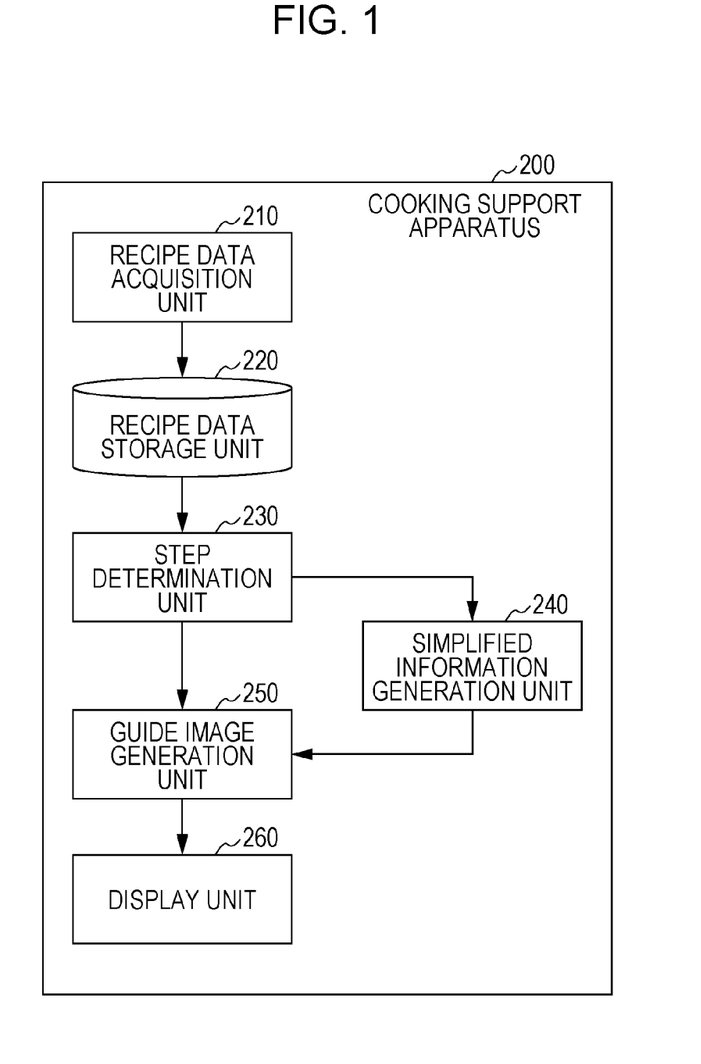
FIG. 1 illustrates an example of a configuration of a cooking support apparatus including a display apparatus according to the present embodiment.

FIG. 1 is a block diagram illustrating an example of a configuration of a cooking support apparatus including a display apparatus according to the present embodiment.

In FIG. 1, the cooking support apparatus 200 includes a recipe data acquisition unit 210, a recipe data storage unit 220, a step determination unit 230, a simplified information generation unit 240, a guide image generation unit 250, and a display unit 260.

The recipe data acquisition unit 210 acquires recipe data of a recipe to be displayed.

More specifically, the recipe data acquisition unit 210 accepts a user's recipe search operation using a search keyword such as a recipe name or an ingredient via the liquid crystal display with touch panel. Then, for example, the recipe data acquisition unit 210 receives recipe data of a recipe selected by the user from a server on the Internet or the like via the wireless communication circuit.

Then, the recipe data acquisition unit 210 supplies the acquired recipe data to the recipe data storage unit 220.

The recipe data storage unit 220 stores therein the supplied recipe data so that that the recipe data is readable by the step determination unit 230 that will be described later.

The recipe data is data including detailed information indicating details of contents of each of a plurality of steps that should be executed in order during cooking, order information indicating the order of the plurality of steps, and ingredient information indicating ingredients necessary for cooking.

Figure 2:
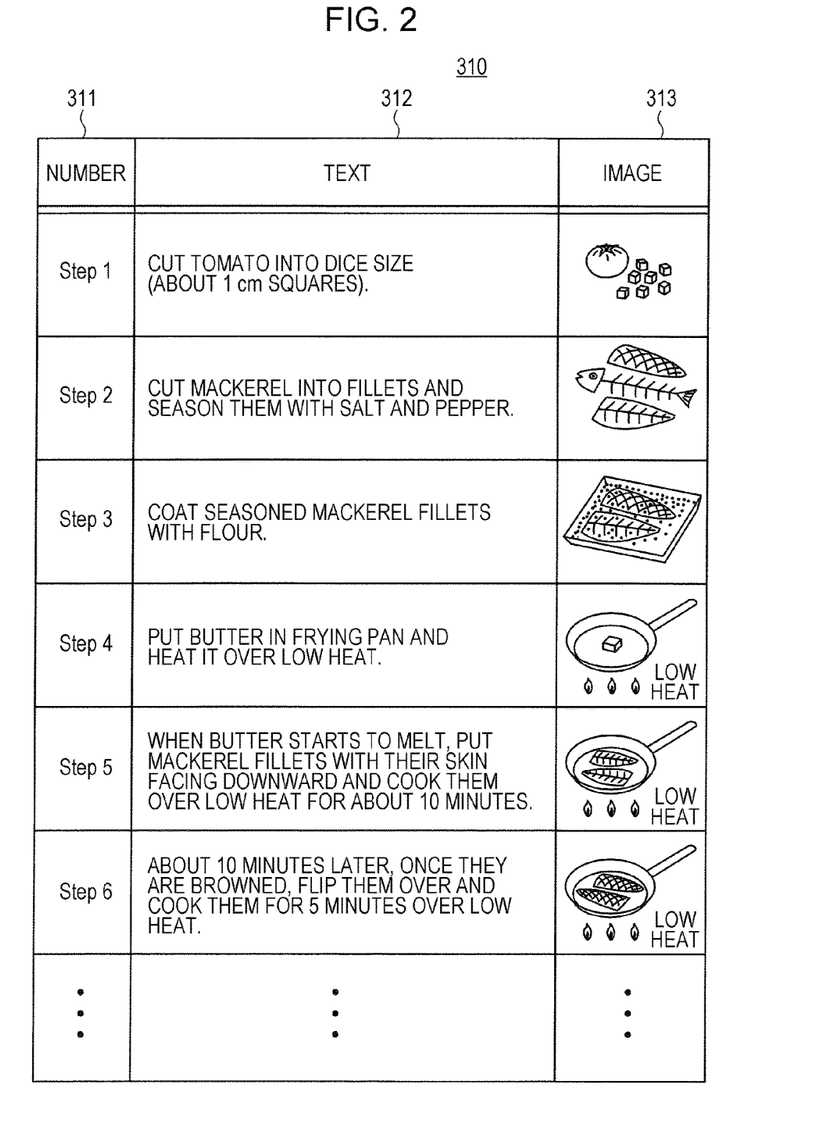
FIG. 2 illustrates an example of contents of recipe data in the present embodiment.

FIG. 2 is a diagram illustrating an example of contents of the recipe data stored in the recipe data storage unit 220. In FIG. 2, only the detailed information and the order information of each step are illustrated.

As illustrated in FIG. 2, recipe data 310 includes numbers 311 indicative of numbers of the respective steps in a cooking procedure, texts 312 that are descriptions of contents of the respective steps, and images 313 illustrating appearances of the respective steps.

For example, the recipe data 310 includes, as detailed information of a step with a number 311 "Step4", a text 312 "PUT BUTTER IN FRYING PAN AND HEAT IT OVER LOW HEAT." and an image 313 illustrating a state where butter is heated in a frying pan over low heat. The recipe data 310 includes, as detailed information of a step with a number 311 "Step5", a text 312 "WHEN BUTTER STARTS TO MELT, PUT MACKEREL FILLETS WITH THEIR SKIN FACING DOWNWARD AND COOK THEM OVER LOW HEAT FOR ABOUT 10 MINUTES." and an image illustrating a state where the skin sides of mackerel fillets are being heated over low heat.

As described above, the recipe data 310 includes the order of a plurality of steps in cooking, and texts and images describing details of contents of the respective steps.

See FIG. 1 again. The step determination unit 230 determines one step from among the plurality of steps (Step1, Step2, . . . ) indicated by the recipe data stored in the recipe data storage unit 220.

More specifically, the step determination unit 230 accepts a user's operation of selecting a step via the liquid crystal display with touch panel and sequentially determines one step from among the plurality of steps in accordance with the accepted operation. The user's operation of selecting a step is, for example, an operation of sequentially shifting a main target to be displayed (i.e., a step that should be currently executed by the user) from a task that should be executed first to another step. Such an operation is, for example, an operation of swiping a guide screen that will be described later upward or leftward.

Every time a step is determined, the step determination unit 230 acquires, from the recipe data, detailed information of the determined step (a first step, hereinafter referred to as a "target step") and detailed information of a step that should be executed next to the determined step (a second step, hereinafter referred to as a "next step"). Then, the step determination unit 230 supplies the acquired detailed information of the target step (hereinafter referred to as "target step detailed information") to the guide image generation unit 250, and supplies the acquired detailed information of the next step to the simplified information generation unit 240.

The simplified information generation unit 240 generates simplified information (hereinafter referred to as "next step simplified information") briefly describing contents of the next step on the basis of the supplied detailed information of the next step.

More specifically, the simplified information generation unit 240 generates, from the detailed information, the next step simplified information whose degree of detail is lower than the original detailed information on the basis of a predetermined rule. Details of the predetermined rule (hereinafter referred to as a "simplification rule") in generation of the next step simplified information will be described later.

Then, the simplified information generation unit 240 supplies the generated next step simplified information to the guide image generation unit 250.

The guide image generation unit 250 generates a guide image including both of the target step detailed information and the next step simplified information on the basis of the supplied target step detailed information and the supplied next step simplified information.

More specifically, the guide image generation unit 250 generates a guide image so that the target step detailed information and the next step simplified information are clearly distinguishable from each other, for example, the target step detailed information has a larger display region.

Then, the guide image generation unit 250 supplies the generated guide image to the display unit 260.

The display unit 260 displays the supplied guide image.

More specifically, the display unit 260 displays the guide image on the liquid crystal display with touch panel and thus presents the recipe information to the user.

Note that functions of each unit of the cooking support apparatus 200 can be, for example, realized by a computer program.

Figure 3:
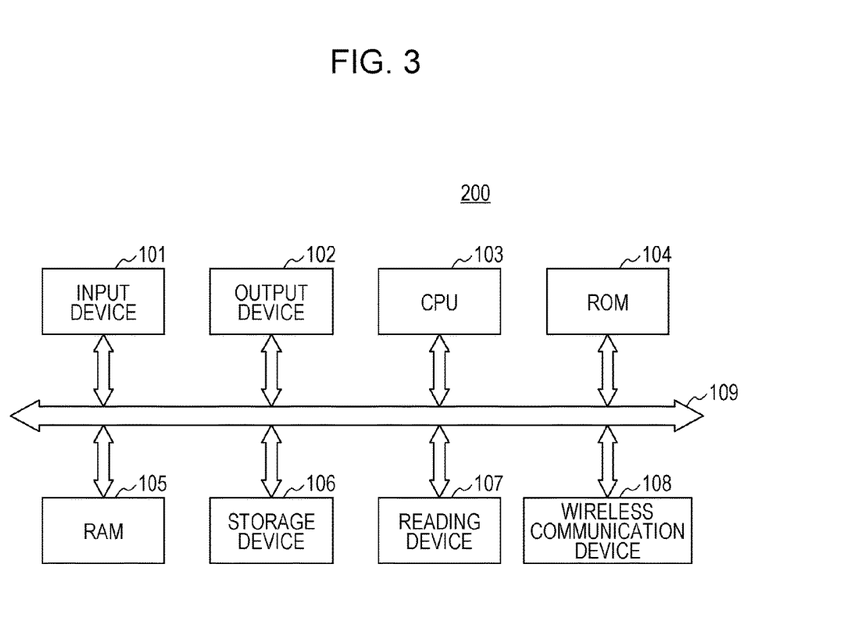
FIG. 3 illustrates an example of a hardware configuration of the cooking support apparatus according to the present embodiment.

FIG. 3 is a diagram illustrating an example of a hardware configuration of the cooking support apparatus 200 in a case where the functions are realized by a computer program.

As illustrated in FIG. 3, the cooking support apparatus 200 includes an input device 101 including the touch panel, an output device 102 including the liquid crystal display, a CPU (Central Processing Unit) 103, a ROM (Read Only Memory) 104, a RAM (Random Access Memory) 105, a storage device 106 such as a flash memory, a reading device 107 that reads information from a storage medium such as a USB (Universal Serial Bus) memory, and a wireless communication device 108 including the wireless communication circuit, and these devices are connected to each other via a bus 109.

The program for realizing the functions of each unit of the cooking support apparatus 200 is acquired, for example, in a manner such that the reading device 107 reads the program from a storage medium in which the program is stored and causes the program to be stored in the storage device 106. Alternatively, the program for realizing the functions of each unit of the cooking support apparatus 200 is acquired in a manner such that the wireless communication device 108 downloads the program from a server device connected to a network by communicating with the server device and causes the program to be stored in the storage device 106.

The functions of each unit of the cooking support apparatus 200 are, for example, realized in a manner such that the CPU 103 copies the program stored in the storage device 106 into the RAM 105 and sequentially reads out and executes commands included in the program from the RAM 105.

The cooking support apparatus 200 having such a configuration can display, on a single screen, information (target step detailed information) indicative of contents of a step selected by the user and information (next step simplified information) indicative of contents of a step that should be executed next to the selected step so that these pieces of information are clearly distinguishable from each other.

Simplification Rule

Details of the simplification rule for generating the next step simplified information are described below by giving an example.

The simplification rule is, for example, a rule that a summary of a text included in detailed information is generated and a combination of the summary and a number indicative of a step order is used as the next step simplified information.

Note that any of various rules can be used as a rule (hereinafter referred to as a "summarization rule") for generation of a summary.

Figure 4:
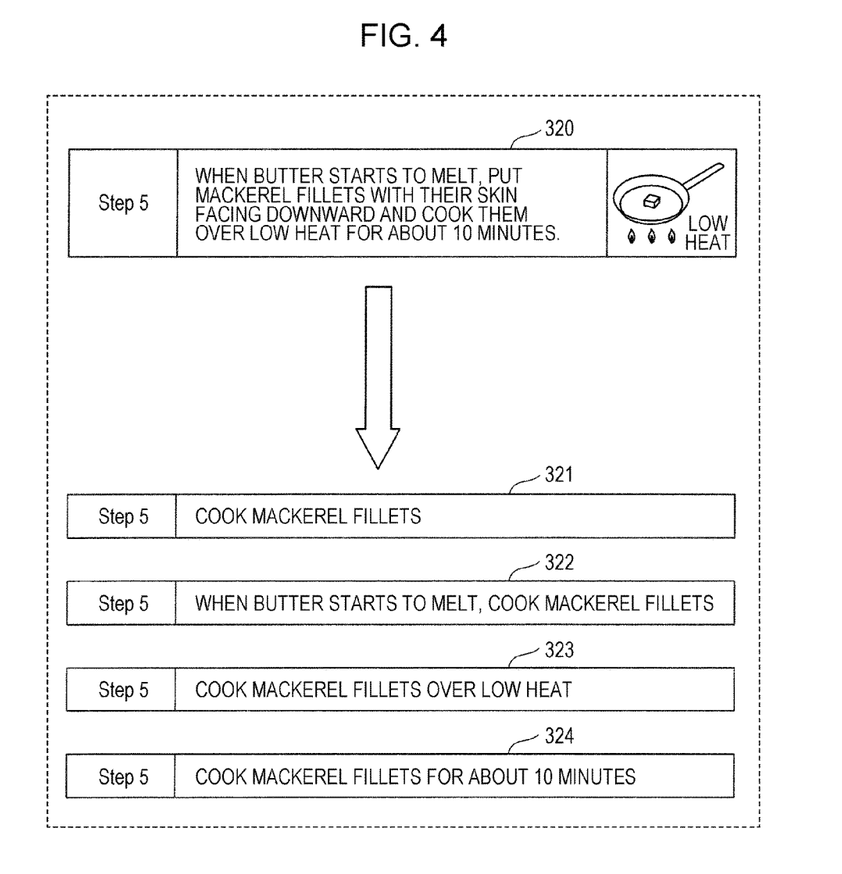
FIG. 4 illustrates an example of a summarization rule in the present embodiment.

FIG. 4 is a diagram for explaining an example of the summarization rule.

For example, the summarization rule is a rule that a noun clause including an ingredient and a verb clause including a cooking action in a text of detailed information are combined. In this case, the simplified information generation unit 240 parses the text and divides the text into a noun clause, a verb clause, a modifier clause, and the like. Then, the simplified information generation unit 240 retrieves a noun included in a phrase that has been judged a noun clause from the ingredient information included in the recipe data. Then, the simplified information generation unit 240 determines that a noun clause including a noun included in the ingredient information is a noun clause including an ingredient and determines that a verb clause corresponding to the noun clause is a verb clause including a cooking action.

For example, in the case of the text 320 "WHEN BUTTER STARTS TO MELT, PUT MACKEREL FILLETS WITH THEIR SKIN FACING DOWNWARD AND COOK THEM OVER LOW HEAT FOR ABOUT 10 MINUTES.", the simplified information generation unit 240 determines that "MACKEREL FILLETS" is a noun clause including an ingredient and determines that "COOK" is a verb clause including a cooking action. Then, the simplified information generation unit 240 generates a summary 321 "COOK MACKEREL FILLETS" by combining "MACKEREL FILLETS" and "COOK".

The summarization rule may be a rule that a modifier clause concerning a step transition condition among modifier clauses that modify the verb clause including the cooking action is added to the summary 321. In this case, the simplified information generation unit 240 generates a summary 322 "WHEN BUTTER STARTS TO MELT, COOK MACKEREL FILLETS".

The summarization rule may be a rule that a modifier clause including a phrase concerning the heat among modifier clauses that modify the verb clause including the cooking action is added to the summary 321. In this case, the simplified information generation unit 240 generates a summary 323 "COOK MACKEREL FILLETS OVER LOW HEAT".

The summarization rule may be a rule that a modifier clause including a phrase concerning a time among modifier clauses that modify the verb clause including the cooking action is added to the summary 321. In this case, the simplified information generation unit 240 generates a summary 324 "COOK MACKEREL FILLETS FOR ABOUT 10 MINUTES".

The step determination unit 230 may select a rule to be used from among a plurality of summarization rules in accordance with a predetermined order of priority (e.g., the step transition condition, heat, time . . . ). The step determination unit 230 may adopt a summary whose number of characters is maximum within a predetermined range from among a plurality of summaries that can be generated on the basis of the plurality of summarization rules. That is, the step determination unit 230 may adjust a degree to which a text is summarized so that the summary fits into a predetermined display region.

Operation of Apparatus

Next, an operation of the cooking support apparatus 200 is described.

Figure 5:
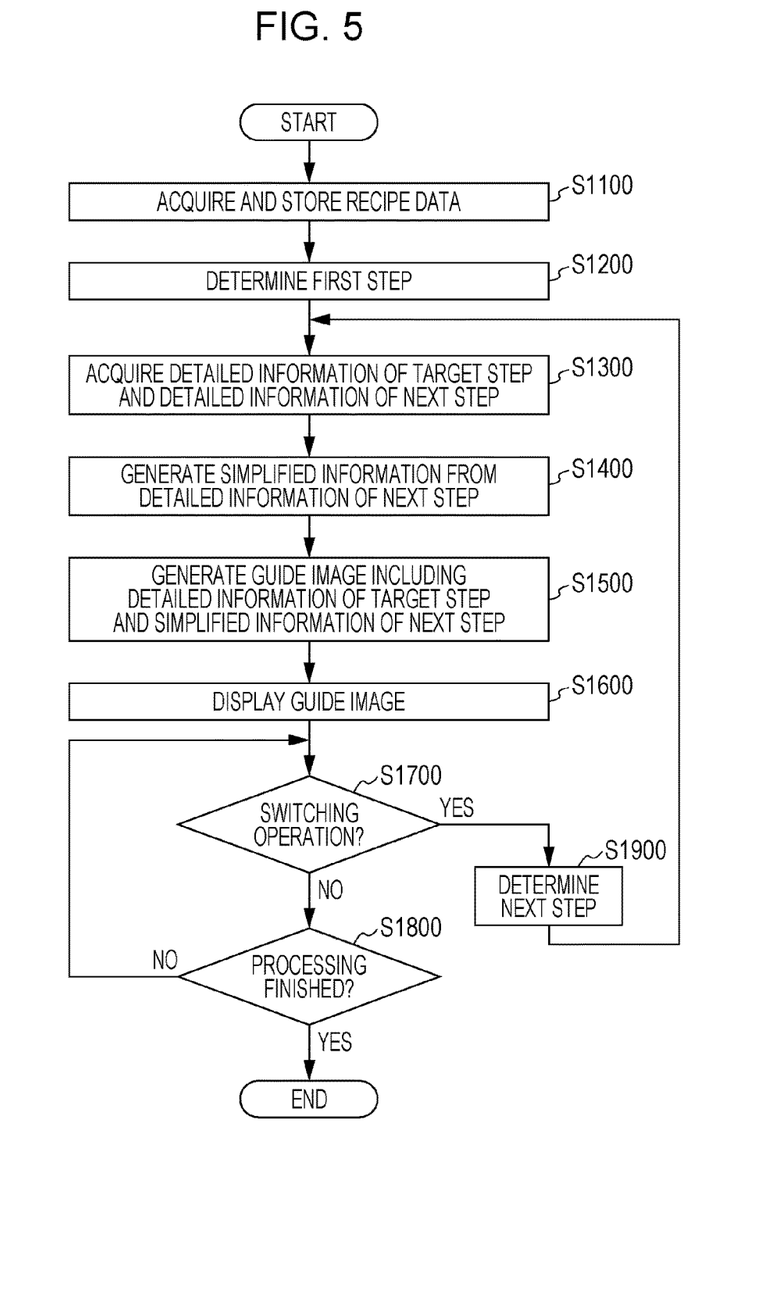
FIG. 5 is a flow chart illustrating an example of an operation of the cooking support apparatus according to the present embodiment.

FIG. 5 is a flow chart illustrating an example of an operation of the cooking support apparatus 200.

In Step S1100, the recipe data acquisition unit 210 acquires recipe data and then stores the recipe data in the recipe data storage unit 220.

In Step S1200, the step determination unit 230 determines a step (Step1) that should be executed first during cooking by referring to the recipe data. That is, the first step in a cooking procedure first becomes a target step.

Note that the step determination unit 230 may display a list of ingredients necessary for cooking and a list of a series of step contents on the basis of ingredient information included in the recipe data before the processing in Step S1200. By displaying such lists, a user can grasp the entire cooking procedure and the necessary ingredients. In this case, the step determination unit 230 performs the processing in Step S1200 on a condition that a predetermined operation indicating "start cooking" has been performed.

In Step S1300, the step determination unit 230 acquires detailed information of the target step and detailed information of a next step from the recipe data.

In Step S1400, the simplified information generation unit 240 generates simplified information of the next step from the detailed information of the next step.

In Step S1500, the guide image generation unit 250 generates a guide image including the detailed information of the target step (target step detailed information) and the simplified information of the next step (next step simplified information).

In Step S1600, the display unit 260 displays the generated guide image. The user executes the cooking step by referring to the target step detailed information included in the guide image and prepares for the next step as needed by referring to the next step simplified information included in the guide image.

In Step S1700, the step determination unit 230 determines whether or not an operation (hereinafter referred to as a "switching operation"), such as a swiping operation mentioned above, for switching the main display target to the next step has been performed by the user. In a case where the switching operation has not been performed (NO in S1700), the step determination unit 230 proceeds to Step S1800.

In Step S1800, the step determination unit 230 determines whether or not an instruction to finish the processing has been given by a user's operation or the like. In a case where the instruction to finish the processing has not been given (NO in S1800), the step determination unit 230 returns to Step S1700 while maintaining the display state of a guide screen.

Once the step corresponding to the target step detailed information is finished, the user performs a switching operation. In a case where a switching operation has been performed (YES in S1700), the step determination unit 230 proceeds to Step S1900.

In Step S1900, the step determination unit 230 determines a next step and returns to Step S1300. That is, the main display target is switched to the step next to the determined step. This step is the step whose contents are previously indicated by the next step simplified information.

By repeating the processing in Steps S1100 through S1900 in accordance with a user's operation of shifting a display target, contents of the guide image are switched in accordance with the cooking procedure.

Figure 6:
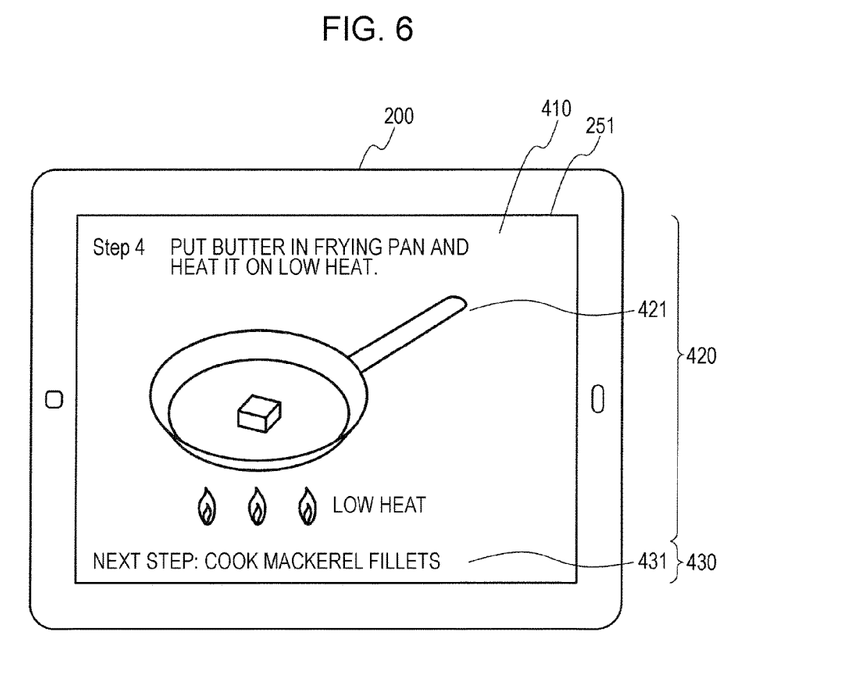
FIG. 6 illustrates an example of a guide image in the present embodiment.

FIG. 6 is a diagram illustrating an example of the guide image. FIG. 6 illustrates an example of the guide image displayed in a case where the fourth step (Step4) in the recipe data 310 illustrated in FIG. 2 is being selected.

As illustrated in FIG. 6, a guide image 410 is displayed on a liquid crystal display with touch panel 251 of the cooking support apparatus 200. The guide image 410 has a main region 420 in which target step detailed information 421 is displayed and a sub region 430 in which next step simplified information 431 is displayed. The main region 420 is larger than the sub region 430 and is located on an upper side of the sub region 430.

The target step detailed information 421 is made up of a number "Step4", a text "PUT BUTTER IN FRYING PAN AND HEAT IT ON LOW HEAT.", and an image illustrating a state where butter is heated in a frying pan over low heat. This is identical to the detailed information of the fourth step included in the recipe data 310.

Meanwhile, the next step simplified information 431 is made up of a text "NEXT STEP" indicative of a next step and a summary "COOK MACKEREL FILLETS" briefly describing contents of the next step. This summary is a summary of the text "WHEN BUTTER STARTS TO MELT, PUT MACKEREL FILLETS WITH THEIR SKIN FACING DOWNWARD AND COOK THEM OVER LOW HEAT FOR ABOUT 10 MINUTES." of the detailed information of the fifth step described in FIG. 4.

Note that in a case where a switching operation is performed, the fifth step becomes the target step, and accordingly, a text "Step5. WHEN BUTTER STARTS TO MELT, PUT MACKEREL FILLETS WITH THEIR SKIN FACING DOWNWARD AND COOK THEM OVER LOW HEAT FOR ABOUT 10 MINUTES." and a corresponding image are displayed in the main region 420 of the guide image 410.

Figure 7:
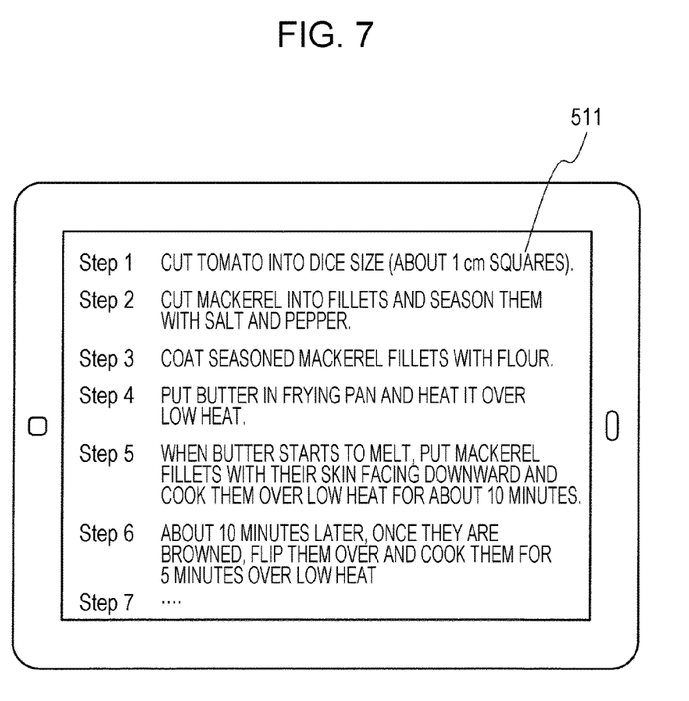
FIG. 7 illustrates an example of a guide image according to the technique described in Japanese Unexamined Patent Application Publication No. 2013-213663 for reference.
Figure 8:
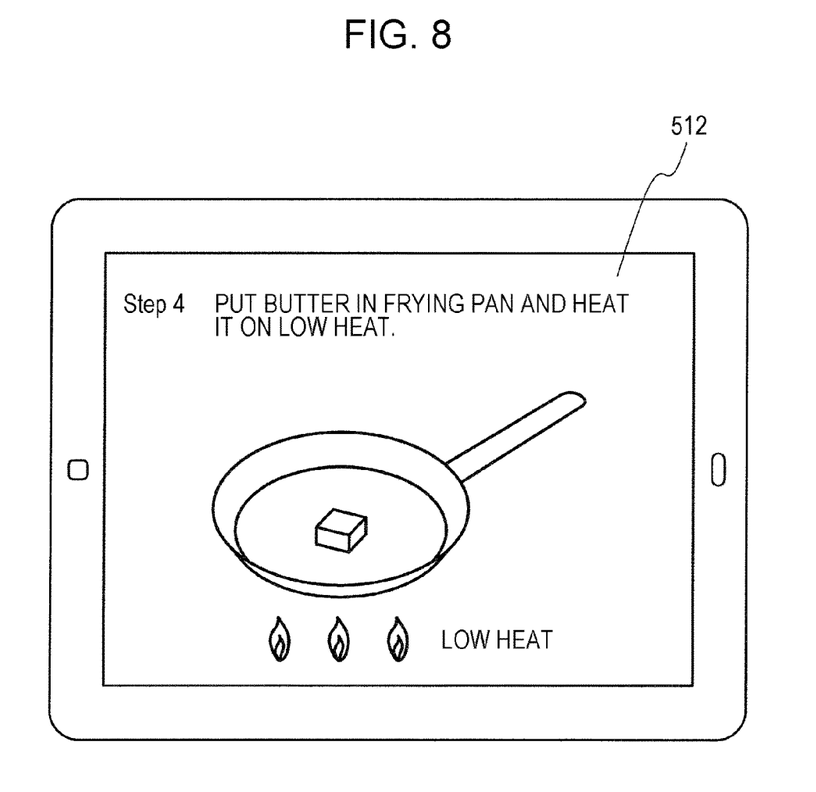
FIG. 8 illustrates an example of a guide image according to the technique described in Japanese Unexamined Patent Application Publication No. 2002-215886 for reference.

For reference, FIG. 7 illustrates an example of a guide image according to the technique described in Japanese Unexamined Patent Application Publication No. 2013-213663, and FIG. 8 illustrates an example of a guide image according to the technique described in Japanese Unexamined Patent Application Publication No. 2002-215886.

In the case of a guide image 511 in which detailed information of a series of steps is collectively displayed as illustrated in FIG. 7, it is difficult to grasp where contents of a step that should be currently executed are displayed. In the case of a guide image 512 in which detailed information of a single step is displayed as illustrated in FIG. 8, contents of a step that should be executed next cannot be grasped.

Meanwhile, in the case of the guide image 410 according to the present embodiment (see FIG. 6), it is possible to not only easily grasp detailed contents of a step that should be currently executed, but also grasp an outline of a step that should be executed next. This allows a user to grasp the contents of the next cooking step in advance and make necessary preparations while executing the current cooking step.

See FIG. 5 again. In a case where the instruction to finish the processing has been given (YES in S1800), the step determination unit 230 finishes displaying the guide image.

Through the above operation, the cooking support apparatus 200 can display a guide image for presenting not only detailed information of a step that is currently executed by a user but also simplified information of a step that should be executed next in accordance with the progress of a cooking procedure.

Note that the step determination unit 230 may preserve acquired detailed information of a next step until a main display target is switched to the next step and use the preserved detailed information as detailed information of the new target step. The detailed information may be preserved in the guide image generation unit 250. In this case, every time the step determination unit 230 acquires detailed information of a next step, the step determination unit 230 supplies the acquired detailed information to the guide image generation unit 250.

The step determination unit 230 may accept a user's operation for switching a main display target in a direction reverse to the order of steps and a user's operation for selecting a desired step.

Effects of Present Embodiment

As described above, the cooking support apparatus 200 according to the present embodiment determines one step from among a plurality of steps that should be executed in order during cooking and displays a guide image including information indicative of contents of a target step that is the determined step and information indicative of contents of a next step that is a step that should be executed next to the selected step.

With the arrangement, the cooking support apparatus 200 can not only present, to a user, detailed contents of a step that should be currently executed in a manner easy to understand, but also additionally present an outline of a step that should be executed next. That is, use of the cooking support apparatus 200 allows a user to instantly check contents of a step that should be currently executed and prepare a cooking instrument and an ingredient necessary for a next step at each time in a cooking procedure. Therefore, the cooking support apparatus 200 can effectively support cooking that is done with reference to recipe information.

Modifications of Present Embodiment

The configuration of a guide image is not limited to the aforementioned example. For example, a guide image may be arranged such that detailed information of a target step is displayed on an entire screen and simplified information of a next step is displayed in part of the display region. The guide image may further include other information in addition to the target step detailed information and the next step simplified information. Such information is, for example, information indicating where the target step is located in the entire cooking procedure, information describing contents of another step more briefly than the next step, or ingredient information.

Furthermore, contents of recipe data and a method for acquiring recipe data are not limited to the aforementioned examples. For example, the recipe data may include information concerning a time of each step or information concerning a step transition timing. Furthermore, the recipe data may be generated by the cooking support apparatus itself in accordance with a user's operation or the like.

A method for determining one step from among a plurality of steps is not limited to the aforementioned example. For example, the step determination unit 230 may automatically switch a step that is a main display target on the basis of a period elapsed from the start of cooking or the start of each step and an operation of a cooking instrument such as completion of an operation of an oven.

A simplification rule and a summarization rule for generating next step simplified information are not limited to the aforementioned examples. For example, the simplified information generation unit 240 may use a simplification rule that only a text or an image in detailed information is used as simplified information. The simplified information generation unit 240 may determine whether or not to simplify detailed information of a next step, which of a plurality of simplification rules is used, or which of a plurality of summarization rules is used in accordance with the size of a region in which a guide image is displayed on a display. The simplified information generation unit 240 may accept a user's operation of determining which rule is used to generate simplified information of a next step.

Figure 9:
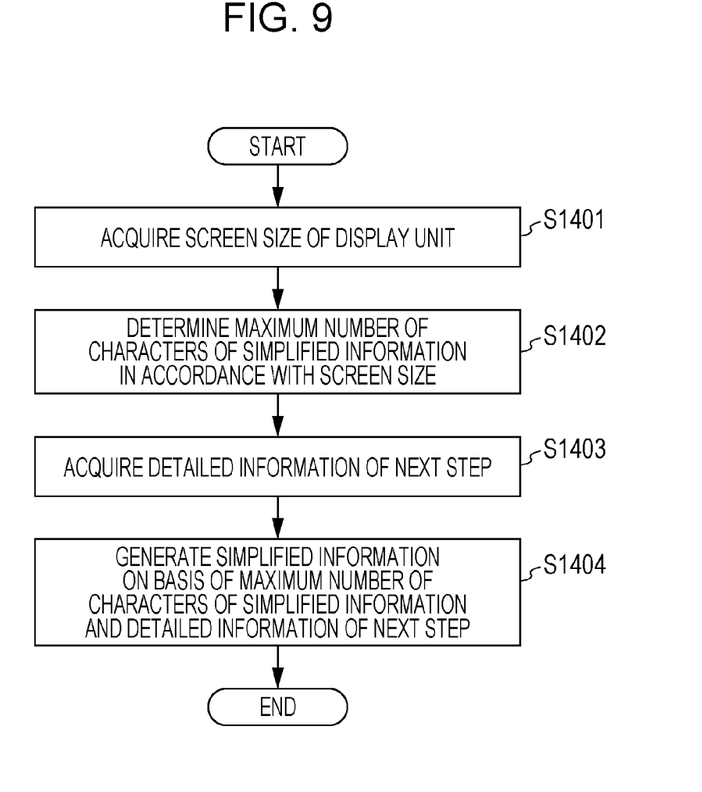
FIG. 9 is a flow chart illustrating an example of an operation of the cooking support apparatus for generating simplified information in the present embodiment.

An example of a modification of a simplification rule for generating next step simplified information is described below. FIG. 9 is a flow chart illustrating an example of processing for generating next step simplified information. Specifically, the flow illustrated in FIG. 9 replaces the processing in Step S1400 illustrated in FIG. 5. After Step S1300, the simplified information generation unit 240 acquires screen size information indicative of a screen size of the display unit 260 in Step S1401. The screen size information may be stored in a storage unit (not illustrated) of the cooking support apparatus 200.

In Step S1402, the simplified information generation unit 240 determines a maximum number of characters indicative of the number of characters that can be displayed on the display unit 260 on the basis of the acquired screen size information. To determine the maximum number of characters, the font size of characters is set to a predetermined value, and it is determined how many characters of the predetermined font size can be displayed on the display unit 260. Note that the maximum number of characters may be the number of characters that can be displayed in a partial display region in which an image including simplified information of a next step is to be displayed in the screen size information.

In Step S1403, the simplified information generation unit 240 acquires detailed information of a next step.

In Step S1404, the simplified information generation unit 240 generates simplified information on the basis of the maximum number of characters determined in Step S1402 and the detailed information of the next step acquired in Step S1403.

A method for acquiring the simplified information of the next step is not limited to the aforementioned example. For example, in a case where recipe data includes simplified information of each step, the cooking support apparatus may acquire the simplified information of each step from the recipe data. The cooking support apparatus may acquire simplified information of each step by requesting an external device such as a text summarizing server to summarize detailed information.

Application of the disclosure related to a display apparatus is not limited to the aforementioned example. For example, the present disclosure is applicable to various kinds of apparatuses including an image display unit such as a smartphone, a cooking appliance such as a microwave oven, a gaming terminal, a television set, a personal computer, a head-mounted display (HMD), and a projector. Head-mounted displays are largely classified into an "immersive type (non-transparent type)" covering eyes of a user and a "transparent type" such as a glasses whose lenses are transparent displays. In a case where the present disclosure is applied to a head-mounted display, the transparent type is desirable since a user can do cooking while referring to a recipe, but the present disclosure may be applied to an immersive type head-mounted display.

Some of the constituent elements of the display apparatus according to the present disclosure may be physically separated from the other constituent elements of the display apparatus. In this case, each of these constituent elements need include a communication unit for communicating with each other.

The present disclosure can effectively support cooking that is done with reference to recipe information, and is useful as a display control method, a recording medium, and a display apparatus.

What is claimed is:

1. A method comprising:
    causing a processor to acquire recipe data including a plurality of steps that should be executed in order in cooking;
    causing the processor to determine a first step from the plurality of steps;
    causing the processor to acquire first detailed information of the first step and second detailed information of a second step from the recipe data, the second step should be executed next to the first step;
    causing the processor to acquire a screen size of a display;
    causing the processor to generate simplified information of briefly describing contents of the second step based on the acquired second detailed information and the acquired screen size of the display; and
    causing the processor to display, on the display, a guide image including both of first indicative contents of the determined first step and second indicative contents of the second step and not including third indicative contents of a third step that should be executed next to the second step, the first indicative contents and the second indicative contents respectively corresponding to the first detailed information of the first step and the simplified information on the second step.

2. The method according to claim 1, wherein
    in the guide image, a display region of the second indicative contents of the second step is smaller than a display region of the first indicative contents of the first step.

3. The method according to claim 2, wherein
    in the guide image, a degree of detail of the second indicative contents of the second step is lower than a degree of detail of the first indicative contents of the first step.

4. The method according to claim 3, wherein
    the causing the processor to determine the first step includes sequentially switching the first step among the plurality of steps;
    the causing the processor to display the guide image includes switching contents of the guide image in accordance with the switching of the first step determined in the causing the processor to determine the first step; and
    in the guide image, at least one of a display region or a degree of detail of indicative contents of each of the plurality of steps differ between when the step is the first step and when the step is the second step.

5. The method according to claim 1, wherein
    each of the first detailed information and the second detailed information includes text information; and
    the causing the processor to generate the simplified information includes parsing a text indicated by the text information of the second step and generating a summary of the text as at least part of the simplified information.

6. The method according to claim 5, wherein
    the causing the processor to generate the simplified information includes adjusting a degree to which the text is summarized so that the summary fits into a predetermined display region.

7. The method according to claim 1, wherein
    each of the first detailed information and the second detailed information includes text information and image information; and
    the simplified information does not include the image information.

8. The method according to claim 1, wherein
    the causing the processor to determine the first step includes accepting a user's operation of selecting a single step from the plurality of steps and sequentially determining the first step in accordance with the accepted operation.

9. The method according to claim 1, further comprising:
    after the guide image is displayed, causing the processor to display, on the display, another guide image including both of the second indicative contents of the second step and the third indicative contents of the third step and not including the first indicative contents of the first step,
    wherein the second indicative contents of the second step corresponds to the second detailed information of the second step, and the third indicative contents of the third step corresponds to another simplified information generated based on third detailed information of the third step acquired from the recipe data and the acquired screen size of the display.

10. The method according to claim 1, wherein the simplified information of the second step is generated by reducing an amount of contents of the acquired second detailed information based on the acquired screen size of the display.

11. The method according to claim 1, wherein
    causing the processor to generate simplified information includes:
    causing the processor to determine an amount of information to be displayed on the display based on the acquired screen size of the display, and
    causing the processor to generate the simplified information of the second step such that an amount of the simplified information is within the determined amount of information.

12. The method according to claim 1, wherein
    the first detailed information and the second detailed information include text information,
    causing the processor to generate simplified information includes:
    causing the processor to determine a maximum number of characters that can be displayed on the display based on the acquired screen size of the display, and
    causing the processor to generate the simplified information of the second step based on the text information of the second detailed information and the determined maximum number of characters such that the number of characters of simplified information is within the determined maximum number of characters.

13. A non-transitory computer-readable recording medium having a program stored thereon, the program causing a processor to execute operations comprising:

acquiring recipe data including a plurality of steps that should be executed in order in cooking;

determining a first step from the plurality of steps;

acquiring first detailed information of the first step and second detailed information of a second step from the recipe data, the second step should be executed next to the first step;

acquiring a screen size of a display;

generating simplified information briefly describing contents of the second step based on the acquired second detailed information and the acquired screen size of the display; and displaying, on the display, a guide image including both of first indicative contents of the determined first step and second indicative contents of the second step and not including third indicative contents of a third step that should be executed next to the second step, the first indicative contents and the second indicative contents respectively corresponding to the first detailed information of the first step and the simplified information of the second step.

14. An apparatus comprising:

a processor;

a display; and a memory having a program stored thereon, the program causing the processor to execute operations including:

acquiring recipe data including a plurality of steps that should be executed in order in cooking;

determining a first step from the plurality of steps;

acquiring first detailed information of the first step and second detailed information of a second step from the recipe data, the second step should be executed next to the first step;

acquiring a screen size of the display;

generating simplified information briefly describing contents of the second step based on the acquired second detailed information and the acquired screen size of the display;

generating a guide image including both of first indicative contents of the determined first step and second indicative contents of the second step and not including third indicative contents of a third step that should be executed next to the second step, the first indicative contents and the second indicative contents respectively corresponding to the first detailed information of the first step and the simplified information of the second step; and displaying the generated guide image on the display.

* * * * *